No. 844,535. PATENTED FEB. 19, 1907.
E. I. NICHOLS.
SANITARY DUST REMOVING DEVICE.
APPLICATION FILED AUG. 2, 1905.

2 SHEETS—SHEET 2.

Witnesses

Inventor
Emory I. Nichols.

UNITED STATES PATENT OFFICE.

EMORY I. NICHOLS, OF SAN FRANCISCO, CALIFORNIA.

SANITARY DUST-REMOVING DEVICE.

No. 844,535.　　　Specification of Letters Patent.　　　Patented Feb. 19, 1907.

Application filed August 2, 1905. Serial No. 272,389.

*To all whom it may concern:*

Be it known that I, EMORY I. NICHOLS, a citizen of the United States, residing in the city and county of San Francisco and State of California, have invented an Improvement in Sanitary Dust-Removing Devices; and I hereby declare the following to be a full, clear, and exact description of the same.

My invention relates to improvements in an apparatus which is designed and arranged for the removing and destroying of germs, dust, and refuse from carpets or other fixed fabrics without removing the same from the floor or other places where they may be secured.

The object of my invention is to construct a cheap, simple, and compact apparatus, all in one machine, for creating a vacuum for removing and destroying germs, dust, and refuse from upholstery, carpets, and other fixed or movable articles, whereby the device can be easily moved from place to place, and can be operated by any inexperienced person.

With these and other objects in view, which will readily appear, the invention consists in the novel construction and mode of operating the same, hereinafter more fully described, and illustrated in the accompanying drawings, in which similar figures and letters of reference indicate corresponding parts throughout the several views.

Figure 1:
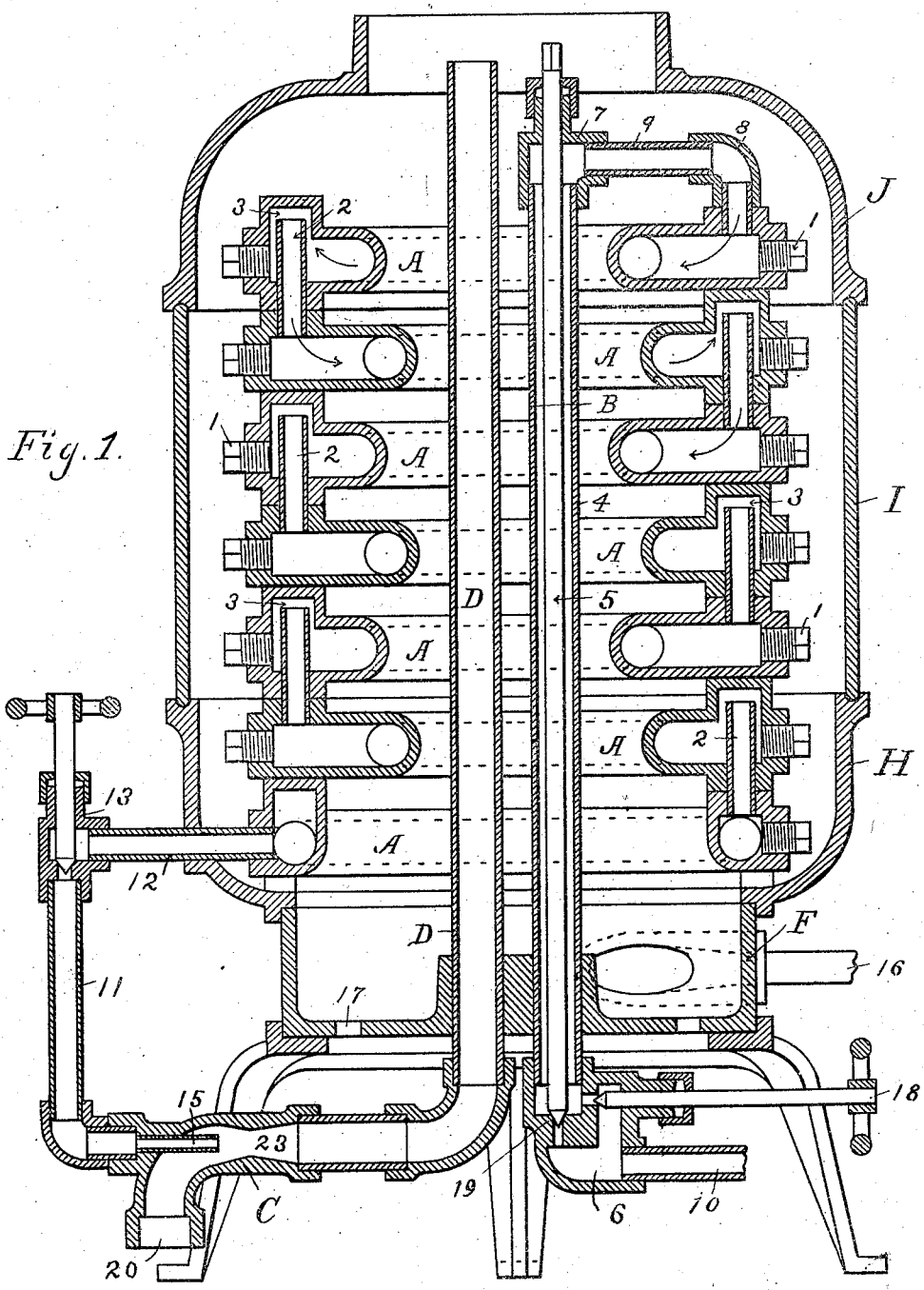
Figure 2:
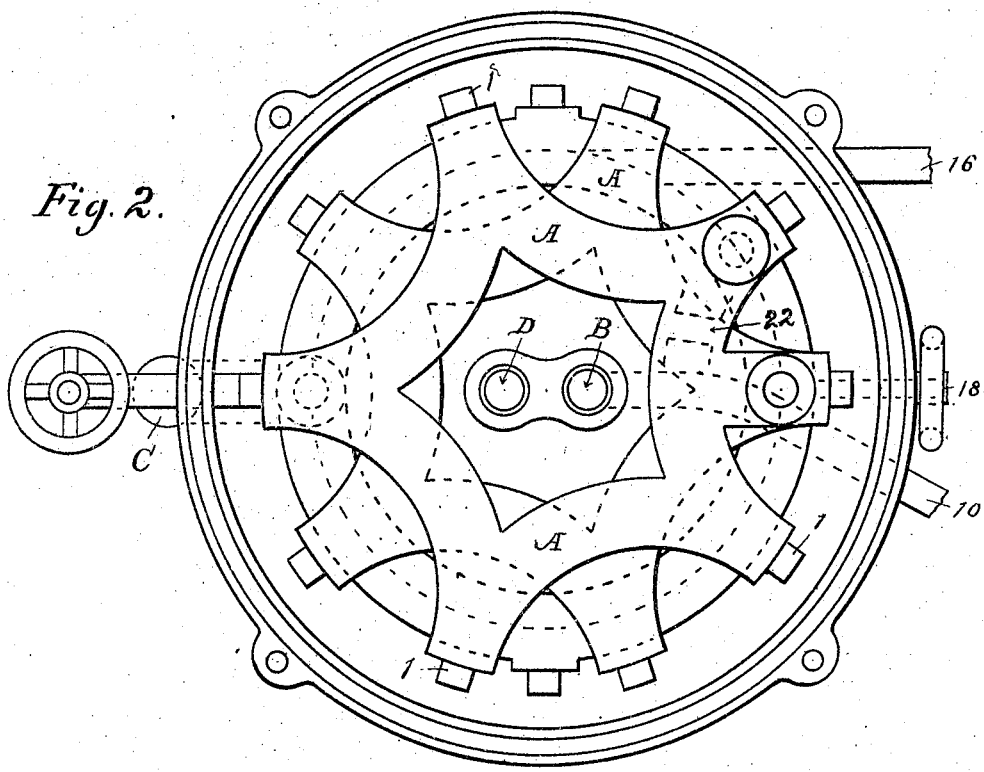
Figure 3:
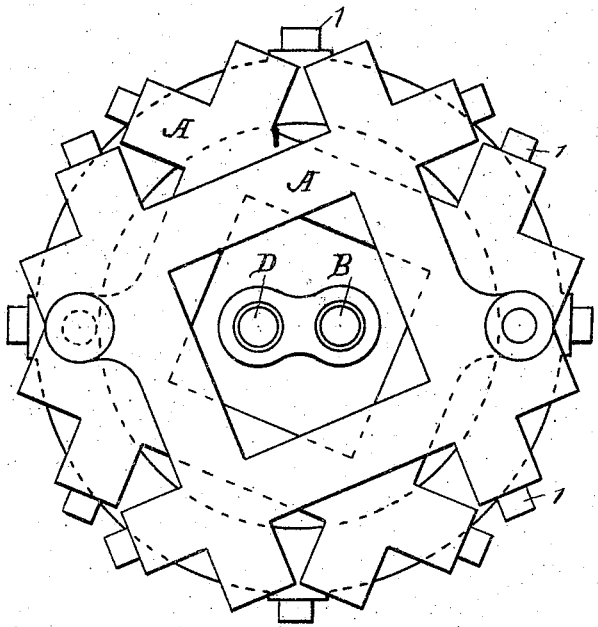

Figure 1 is a central vertical section showing a general construction of a complete device. Fig. 2 is a plan view looking down on the device, showing the design of the generator-sections. Fig. 3 is a plan view of a modified form of constructing the generator-sections.

A A represents the steam-generator and, as shown in Figs. 1, 2, and 3, is composed of a series of hollow sections of any suitable material and form desired, arranged one above another over a source of heat. These sections A A are connected together so as to form one continuous water and steam passage through the whole series of sections, from the water-inlet at the top section to the steam-outlet at the bottom section.

As shown in Fig. 1, the sections are connected at alternate sides, so as to form one continuous water and steam passage through the hollow space in the sections. In Fig. 1, I have shown the sections connected together by pipes, (or other suitable connections may be used.) The upper ends of these pipes 2 extend up into the recess 3, formed in the upper side of the generator-sections A A. The lower ends of the pipes 2, which connect the next section below, are shown flush with the top of the hollow space formed in the sections.

I have shown the sections A A in Fig. 2, in the form of a five-pointed star, and at each outer point I insert the plugs 1 1, and in Fig. 3 I have shown the sections A A in the form of squares with projecting ends, in which ends I insert the plugs 1 1. These forms of constructing the generator-sections gives a large surface exposed to the action of the heat and permits of cleaning the sections A A when required by removing the plugs 1 1. I have shown the bottom section A in the form of a ring, and one or more of these ring-sections may be used in the generator to form a part or all of the fire-box.

B in Fig. 1 represents the water-regulating device for supplying water to the generator (through a plain pipe, and connections may be used, if desired.) The vertical pipe 4 is constructed of copper or brass or a metal that has a greater longitudinal expansion when exposed to the action of heat than the rod or valve-stem 5, which I make of iron or steel or a metal that has a less expansion than the pipe 4. The lower end of the pipe 4 is secured to the valve-casing 6, and the upper end of said pipe is connected to the top generator-section A by the L's 7 and 8 and the pipe 9. The lower end of the rod or valve-stem 5 is seated in the valve-casing 6, and the upper end of the rod passes up through the L 7 for the purpose of adjusting the same. Secured to the valve-casing 6 is the water-supply pipe 10, which can be connected to a hydrant, or a force-pump may be used for supplying the generator with water.

C C in Figs. 1 and 2 represent the steam-ejector for creating the vacuum for operating the sweepers and, as shown, is connected by the pipes 11 and 12 and the valve-casing 13 to the lower section A of the generator for the steam-supply to operate the same. The steam from the generator being under pressure is forced through the nozzle 15 into the larger opening 23 in the ejector, which creates the desired vacuum at 20 to operate the sweepers. The discharge end of the ejector C is connected to the vertical pipe D of any length required and, as shown, passes up through the generator. The heat imparted to the pipe D tends to increase the vacuum to operate the sweepers. As shown, the ejector is constructed with long turns, so as to allow a free passage of dust and other refuse through the ejector. This ejector can be made in many forms, or a common ejector or jet-pump now in use may perform the same object, and I do not confine myself to any particular kind of ejector.

The base for supporting the device can be made of any desired form. As shown, the base is constructed with legs.

F in Fig. 1 represents the oil or gas burner and, as shown, is constructed in a circular form, receiving the oil or gas through the supply-pipe 16, which is connected to one side of the burner. These burners can be made in many different forms, and I do not confine myself to any one form. Though I have shown an oil and gas burner, any kind of fuel may be used. The small holes 17 are for the admission of air when the burner is in operation.

H, I, and J in Figs. 1 and 2 represent the casings which inclose the steam-generator and may be of any design required.

The operation of my device is as follows: First turn on the gas or oil and light same, (through opening, not shown,) and after the fire has been burning a few minutes the operator opens the regulating valve-stem 18 of valve 6 to admit of the proper amount of water, which is forced up through the pipe 4 and into the top section A of generator. The water will follow the course as shown by the arrows in Fig. 1. The top and coldest section will first fill with water before the water will flow into the next section below, and so on in succession. The hottest section, which is the bottom section, (and, perhaps, the two or three of the hottest sections,) does not contain water, because the temperature of the water being raised in passing from the several sections reaches the boiling-point before it arrives at the lower section or sections, and the sections are hotter as they are nearer the fire. The connection-pipes 2 prevent the water in one section from flowing into the section next below it, and hence on to the lowest section. The steam is taken from the lower and hottest section, which passes through the valve 13 and is forced out of nozzle 15 of the ejector C, creating a vacuum and carrying the dust and refuse up through the heated pipe D. Should the operator neglect to open valve 18, or should the same become stopped by some foreign matter, the pipe 4 will then become hot and expand, which will open the port 19 and admit the proper amount of water to flow into the generator and will then open and close automatically.

Having thus described my invention, what I claim, and desire to secure by Letters Patent, is—

1. A dust-removing device, consisting of a steam-generator having a water-inlet pipe connected to the top of the generator, and a steam-outlet pipe connected to the bottom of the generator, a steam-ejector connected to the generator and discharging into or through the generator-chamber, and a heating device located below the generator substantially as set forth.

2. A dust-removing device, consisting of a steam-generator having a water-inlet pipe connected to the top of the generator, and a steam-outlet pipe connected to the bottom of the generator, a steam-ejector connected to the generator and discharging into or through the generator-chamber, a water-regulating device consisting of the water-inlet pipe and valve-stem therein being constructed of two different kinds of metal, one having a greater expansion when exposed to the action of heat than the other, and a heating device located below the generator, substantially as set forth.

3. A dust-removing device, consisting of a steam-generator formed of a series of hollow sections connected together and arranged one above another so as to form one continuous water and steam passage through the whole series of sections, from the water-inlet at the top section, to the steam-outlet at the bottom section, and adapted to prevent the water from flowing by gravitation through the series of sections, means for forcing water into the generator through the water-inlet pipe connected to the top section, a steam-ejector connected to the generator for creating a vacuum, and a heating device located below the generator, substantially as set forth.

4. A dust-removing device, consisting of a steam-generator formed with a series of hollow sections, connected together and arranged one above another, forming one continuous water and steam passage through the whole series of sections, a self-regulating water-supply device, consisting of the water-inlet pipe being formed of a metal having a greater expansion than the valve-stem contained therein, when the same is exposed to the action of heat, a suitably-designed steam-ejector connected to the generator for creating a vacuum, a heating device located below the generator, and means for discharging the dust and refuse into or through the generator-chamber, substantially as set forth.

5. In a dust-removing device, a steam-generator consisting of a series of hollow sections arranged one above another, and connected together, pipes extending up into a recess formed for their reception in the upper side of the sections, and designed to prevent the water from flowing by gravitation to the next section below, means for forcing water into the generator through the water-inlet pipe to the top section, a steam-outlet pipe connecting the lower section of the generator to a suitably-designed ejector for creating a vacuum, and a gas or oil burner located below the generator, substantially as shown and described.

6. The combination of a steam-generator, provided with a flue for carrying off the products of the combustion by which the steam is generated, an ejector, a tube supplying steam from said generator to the nozzle of said ejector, an exhaust-tube leading to the ejector, and a pipe for conveying to said flue the matter discharged from said exhaust-tube by said ejector, said pipe extending into the generator and exposed to the heat thereof, to increase the vacuum caused by the ejector, substantially as set forth.

7. The combination of a steam-generator provided with a flue for carrying off the products of the combustion by which the steam is generated, a water-regulating device consisting of a water-inlet pipe and a valve-stem constructed of two different metals, one having a greater expansion when exposed to the action of heat than the other, an ejector, a tube supplying steam from said generator to the nozzle of said ejector, an exhaust-tube leading to the ejector, and a pipe for conveying to said flue the matter discharged from said exhaust-tube by said ejector, substantially as set forth.

In testimony whereof I affix my signature, in presence of two witnesses, this 27th day of July, 1905.

EMORY I. NICHOLS.

Witnesses:
MARTIN ARONSOHN,
F. B. CARPENTER.